United States Patent [19]

Kim

[11] Patent Number: 5,289,608
[45] Date of Patent: Mar. 1, 1994

[54] WINDSHIELD WIPER FRAME CONNECTOR WHICH ACCOMODATES DIFFERENT SIZE WIPER ARMS

[75] Inventor: In K. Kim, Ansan, Rep. of Korea
[73] Assignee: Alberee Product Inc., Baltimore, Md.
[21] Appl. No.: 888,154
[22] Filed: May 26, 1992

Related U.S. Application Data

[63] Continuation-in-part of Ser. No. 784,514, Oct. 29, 1991, abandoned.

[51] Int. Cl.$^5$ ................................................ B60S 1/40
[52] U.S. Cl. ................................. 15/250.32; 15/250.42
[58] Field of Search ........... 15/250.32, 250.35, 250.42, 15/250.31, 250.41, 250.36

[56] References Cited

U.S. PATENT DOCUMENTS

| | | | |
|---|---|---|---|
| 3,425,089 | 2/1969 | Quinlan et al. | 15/250.32 |
| 3,780,395 | 12/1973 | Quinlan et al. | 15/250.36 |
| 4,354,293 | 10/1982 | Le Sausse et al. | 15/250.32 |
| 4,370,775 | 2/1983 | van den Berg et al. | 15/250.32 |
| 4,443,907 | 4/1984 | Chamberlain | 15/250.32 |
| 5,084,933 | 2/1992 | Buechele | 15/250.32 |

FOREIGN PATENT DOCUMENTS

| | | | |
|---|---|---|---|
| 2034175 | 6/1980 | United Kingdom | 15/250.32 |
| 2055560 | 3/1981 | United Kingdom | 15/250.32 |
| 2119637 | 11/1983 | United Kingdom | 15/250.32 |

Primary Examiner—Harvey C. Hornsby
Assistant Examiner—Gary K. Graham
Attorney, Agent, or Firm—Birch, Stewart, Kolasch & Birch

[57] ABSTRACT

A windshield wiper frame connector for use in a windshield wiper assembly for motor vehicles which accommodates different size wiper arms, wherein the connector includes a pair of slots, two pair of raised portions and a pair of stoppers on a pair of sidewalls for forming two pairs of spaces, upper and lower elongated seats, and an angled slot and a hole, whereby a hook type wiper arm, or a pin type wiper arm, or a bayonet type wiper arm can be easily connected to a blade unit.

3 Claims, 3 Drawing Sheets

WINDSHIELD WIPER FRAME CONNECTOR WHICH ACCOMODATES DIFFERENT SIZE WIPER ARMS

This application is a Continuation-in-Part of application Ser. No. 07/784,514 filed on Oct. 29, 1991, now abandoned, the entire contents of which are hereby incorporated by reference.

BACKGROUND OF THE INVENTION

1. Field of the Invention

The present invention relates generally to the construction of a windshield wiper frame connector and more particularly, to an improved wiper arm and blade unit connector for windshield wipers, comprising first and second slots disposed in the lower portion thereof for rotatably mounting to a transverse pin of the blade unit at the first slot and to a rolled bushing of the pin type arm at the second slot thereof, two pairs of aligned locking members and a pair of stoppers disposed on a pair of front wings thereof for slidably receiving the hook type arm and an angled slot and a hole for slidably receiving and locking a bayonet type wiper arm, thereby improving the performance of the windshield wiper assembly.

2. Description of the Prior Art

Various types of windshield wiper arm and blade unit connectors for a windshield wiper assembly are well known. Such windshield wiper frame connectors include a pair of apertured ears pivotally connected to a pin of the pin type arm as shown in the U.S. Pat. No. 3,425,089 to Quinlan et al and U.S. Pat. No. 3,780,395 to Quinlan et al. However, such prior art wiper frame connectors are costly to manufacture and difficult to assemble with the wiper arm and the blade unit due to their complicated structure. Furthermore, such prior art connectors are incapable of receiving the widely used hook type arm of the windshield wiper assembly which restricts their use in many applicable circumstances.

Conventionally, windshield wiper frame connector 1 as shown in FIG. 8 is equipped with first, second, and third slots 2, 3, and 4 and an L-shaped recess 5 for receiving both the hook type arm and the pin type arm. However, the windshield wiper frame connector 1 suffers from a number of problems. For example, the difference in depth between the first slot 2 of a pin of the blade unit and the second slot of a rolled bushing of the pin type arm causes instability when the pin type arm is connected to the wiper frame connector 1. Moreover, receiving the hook type arm lacks any locking members that would securely lock the hook type arm to the wiper frame connector. The body 6 of such wiper frame connector 1 uses much material and is heavy in weight. These characteristics and above stated problems are disadvantages in achieving an efficient and economical windshield wiper assembly.

SUMMARY OF THE INVENTION

Accordingly, it is an object of the present invention to provide an improved windshield wiper frame connector for use in a windshield wiper assembly for motor vehicles.

Another object of the present invention is to provide an improved connector separately connected to a wiper arm and a blade unit for a windshield wiper assembly.

A further object of the present invention is to provide a windshield wiper frame connector having a pair of slots disposed in the lower portion thereof, the first slot for rotatably mounting to a transverse pin of the blade unit and the other slot rotably receiving a rolled bushing of the pin type wiper arm, and two pairs of aligned locking members and a pair of stoppers disposed on opposite inner surfaces of the front wings thereof such that a hook portion of the hook type arm tightly engages either with a pair of spaces formed between the two pairs of locking members of the wiper connector, or with a pair of spaces formed between the pair of stoppers and a crossmember formed between the front wings, thereby improving the wiping performance of the windshield wiper assembly and extending its operational life. The two pairs of aligned locking members and pair of stoppers can thereby accommodate two different width hook arms. The windshield wiper frame connector also accommodates a bayonet type wiper arm, via an angled slot into which the bayonet type wiper arm can slide and a hole which engages a locking pin on the bayonet type wiper arm.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
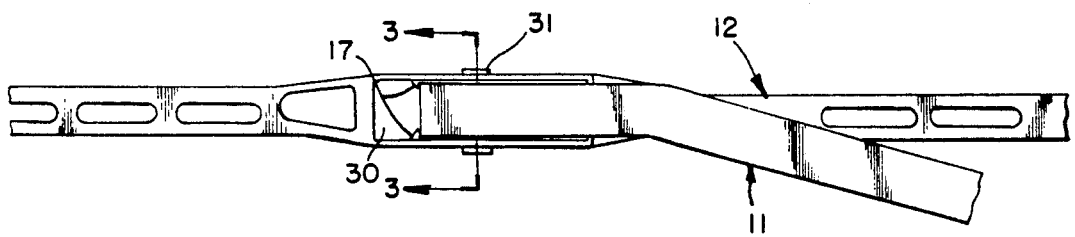
FIG. 1 is a plan view of the windshield wiper frame connector of the present invention for a hook type wiper arm.

Referring now in detail to the drawings for the purpose of illustrating preferred embodiments of the present invention, the windshield wiper frame connector 10 to be connected to a hook type wiper arm 11 and a blade unit 12 for use in a windshield wiper assembly of motor vehicles as shown in FIGS. 1, 2, 3, 4A and 4B, comprises a body member 13, a pair of sidewalls 14, and a first slot 15 and a second slot 16 disposed in the lower portion of the body member 13. A pair of first raised portions 17 and a pair of second raised portions 19 each with a stopper 20 are disposed on the inside surface of a pair of front wings 18 of sidewalls 14, for forming a first pair of spaces between the first and second raised portions 17 and 19, so as to slidably receive a hook portion 21 of the hook type wiper arm 11. A second pair of spaces is formed between stoppers 20 and a cross-member 15a which connects sidewalls 14. This second pair of spaces also slidably receives a hook portion 21 of a hook type wiper arm. However, the first pair of spaces accommodates a wider hook type wiper arm, whereas the second pair of spaces accommodates a narrower hook type wiper arm. In this manner, the connector of the present invention can accommodate two different width hook type wiper arms by slidably receiving and locking the hook portion within either one of two pairs of spaces provided thereon, whereas the conventional connector can accommodate only one width of hook type wiper arm. For example, the connector of the present invention can be used with a 9 mm wide hook portion and a 7 mm wide hook portion, while the conventional connector would require two separate connectors, produced from two separate injection molds, each one of the two to be used with only one size hook portion.

As shown in FIGS. 2, 3, 4A and 4B, a pair of upper elongated horizontal seats 22 extend from the inside surface of the upper portions of the body member 13 and a pair of lower horizontal seats 23 extend from the inside surface of the lower portions of the body member 13 for tightly engaging with the hook type wiper arm 11. Lower horizontal seats 23 are interrupted by slots 15 and 16, whereas upper elongated horizontal seats 22 are uninterrupted. An arc-shaped raised surface 24 is located in the second slot 16.

Figure 2:
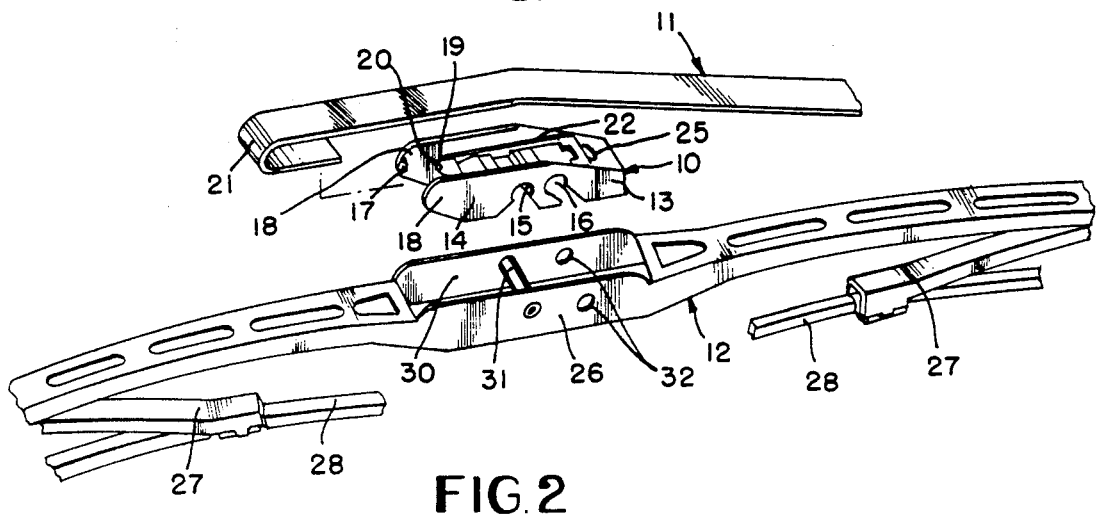
FIG. 2 is an exploded, perspective view of the windshield wiper frame connector of the present invention in combination with the blade unit and the hook type wiper arm.
Figure 3:
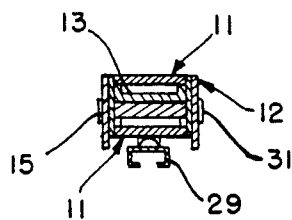
FIG. 3 is a cross-sectional view, taken along line 3—3 in FIG. 1.
Figure 4A:
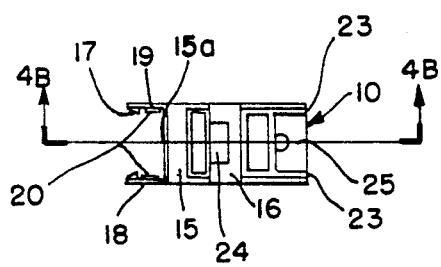
FIG. 4A is a bottom plan view of the wiper frame connector of the present invention.
Figure 4B:
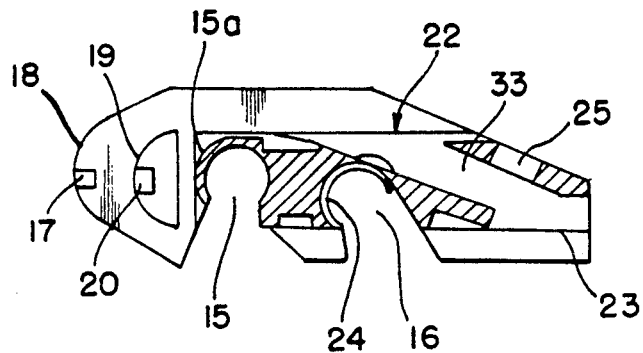
FIG. 4B is a cross-sectional view, taken along line 4B—4B in FIG. 4A.

The blade unit 12 includes a bridge member 26, a pair of primary yokes 27 pivotally connected to the bridge member 26 and a pair of secondary yokes 28 each pivotally connected to one end of the respective primary yoke 27 (FIG. 2). Ends of the pair of secondary yokes 28 and the other end of the pair of primary yokes 26 are provided with a claw 29 (FIG. 3). The bridge member 26 includes an opening 30, a transverse pin 31, and a pair of pin apertures 32. When the hook type wiper arm 11 is connected to the wiper connector 10, the hook portion 21 of the hook type wiper arm 11 covers both first and second slots 15, 16 and tightly connects the wiper arm 11 to the blade unit 12.

Figure 5:
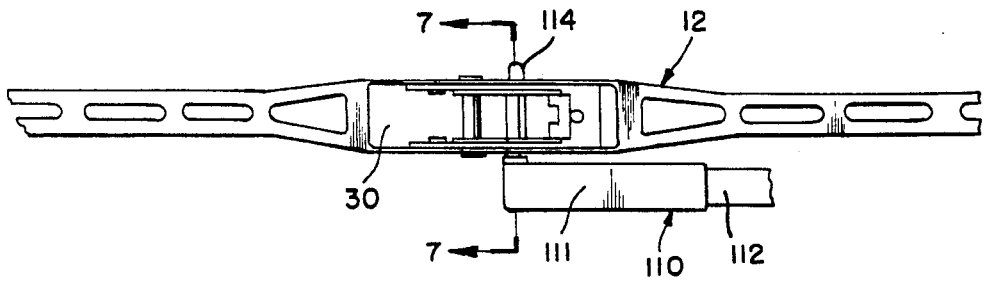
FIG. 5 is a perspective view of the windshield wiper frame connector of the present invention for a pin type wiper arm.
Figure 6:
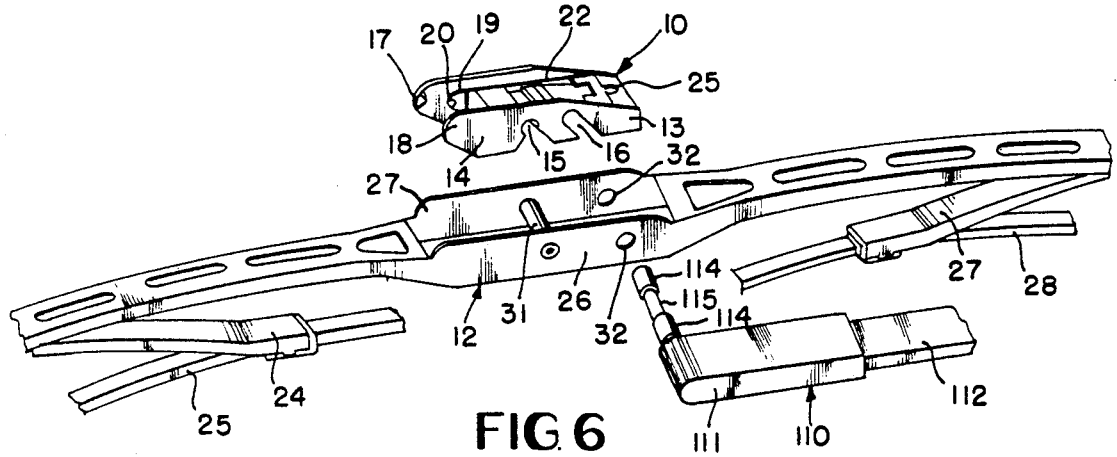
FIG. 6 is an exploded, perspective view of the windshield wiper frame connector of the present invention in combination with the blade unit and the pin type wiper arm.
Figure 7:
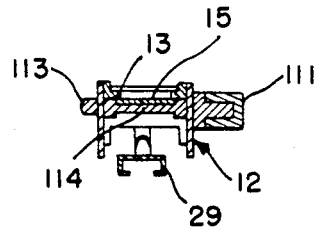
FIG. 7 is a cross-sectional view, taken along line 7—7 in FIG. 5.
Figure 8:
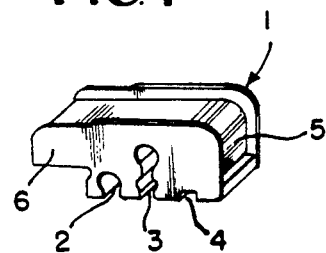
FIG. 8 shows the conventional wiper frame connector.

Referring in detail to FIGS. 5, 6, and 7, there is illustrated the windshield wiper frame connector 10 of the present invention for a pin type wiper arm 110. The pin type wiper arm 110 includes a pin holder 111 with an arm body 112, a transverse pin 113 having a pair of rolled bushings 114 and a reduced portion 115 for rotatably contacting the arc-shaped raised surface 24 of the second slot 16 of the wiper connector 10. At this time, the reduced portion 115 of the transverse pair 113 of the pin type wiper arm 110 can be tightly locked with the arc-shaped raised surface of the second slot 16. Also the pair of rolled bushings 114 are rotatably inserted into the pair of pin apertures 32.

Figure 9:
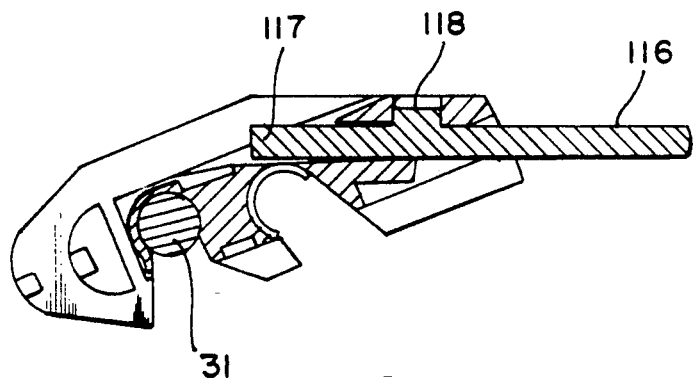
FIG. 9 is a cross-sectional view showing a bayonet type wiper arm in the installed position in the connector of the present invention.

Referring in detail to FIG. 9, there is illustrated the windshield wiper frame connector 10 of the present invention, with a bayonet type wiper arm 116 installed therein. The bayonet type wiper arm includes a free end 117 which is slidably received in an angled slot 33 in connector 10, and a locking pin 118 which is received into a hole 25 disposed on the rear portion of the body member 13. The blade unit 12 is then connected to connector 10 via transverse pin 31, in the same manner as for the hook type wiper arm and the pin type wiper arm discussed above.

Accordingly, the wiper frame connector 10 of the present invention can be easily used as an adapter for the blade unit 12 to connect to the hook type wiper arm 11, or the pin type wiper arm 110, or the bayonet type wiper arm 116 if necessary. Furthermore, the wiper arms 11, 110 and 116 are tightly and securely connected to the blade unit 12 so that the wiper connector 10 of the present invention achieves an effective connecting operation and improves the wiping performance of the windshield wiper assembly a well as its operational lifetime.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A windshield wiper frame connector for connecting a wiper blade unit to a wiper arm said connector comprising:

an elongated body member having a pair of spaced opposing sidewalls, each said sidewall defining an inner and outer surface, said inner surfaces facing one another, a cross-member formed between and connecting said pair of sidewalls, said cross member extending substantially perpendicular to said sidewalls, each of said sidewalls having a front wing portion as an extension of said sidewalls, said front wing portions also defining the inner surfaces;

a first slot disposed in a lower portion of said body member for rotatably receiving a transverse pin of a wiper blade unit;

a second slot disposed in said lower portion of said body member adjacent to said first slot for rotatably receiving a pin of a pin type wiper arm;

an arc-shaped surface located within said second slot, said arc-shaped surface being provided to cooperate with a reduced diameter portion of said pin of a pin type wiper arm;

a pair of opposing first raised portions disposed on said opposing inner surfaces of said front wing portions of said sidewalls;

a pair of opposing second raised portions disposed on said opposing inner surfaces of said front wing portions of the sidewalls, said pair of first raised portions being adjacent to said pair of second raised portions, said first and second raised portions defining therebetween a first space of predetermined width for receiving and locking outer surfaces of a hook portion of a hook type wiper arm of a first width;

a pair of stoppers disposed on said pair of second raised portions; said stoppers projecting inwardly toward each other;

said stoppers and said cross-member defining therebetween a second space of a width less than said predetermined width of said first space for alternatively receiving and locking outer surfaces of a hook portion of a hook type wiper arm of a second width different than said first width; and an upper seat and a lower seat disposed on each said inner surface of said sidewalls, said upper and lower seats being provided for engaging and supporting said hook portion of the hook type wiper arms.

2. The windshield wiper frame connector of claim 1, wherein said upper seats are horizontally elongated without interruption and said lower seats are interrupted by said first and second slots.

3. The windshield wiper frame connector of claim 1, further comprising an angled slot and a hole which are in mutual communication, said angled slot and said hole being disposed in a rear portion of said body member for slidably receiving a bayonet type wiper arm provided with a locking pin for engagement with said hole.

* * * * *